United States Patent [19]

Leonard

[11] 4,243,527
[45] Jan. 6, 1981

[54] PARTICULATE MATERIAL SEPARATOR AND METHOD

[76] Inventor: Martin Leonard, 108 Glen Oak Dr., Layfayette, La. 70503

[21] Appl. No.: 25,038

[22] Filed: Mar. 29, 1979

[51] Int. Cl.³ .................... B01D 21/04; B01D 23/00; B01D 33/00
[52] U.S. Cl. .................... 210/785; 210/801; 210/357; 210/384; 210/386; 210/388; 210/397; 210/407; 210/525; 210/526; 210/532.1
[58] Field of Search .................... 210/65, 77, 83, 84, 210/357, 359, 386, 396, 384, 407, 455, 525, 526, 79, 324, 327, 388, 397, 532 R, 538; 175/66, 206, 207; 209/17

[56] References Cited

U.S. PATENT DOCUMENTS

| | | | |
|---|---|---|---|
| 654,315 | 7/1900 | Lefce | 210/526 |
| 1,794,504 | 3/1931 | Norman | 210/357 |
| 2,503,875 | 4/1950 | Kern | 210/384 |
| 2,919,806 | 1/1960 | Hock et al. | 210/456 |

FOREIGN PATENT DOCUMENTS

| | | | |
|---|---|---|---|
| 474152 | 10/1937 | United Kingdom | 210/526 |
| 604963 | 4/1978 | U.S.S.R. | 210/388 |

Primary Examiner—Charles N. Hart
Assistant Examiner—David R. Sadowski
Attorney, Agent, or Firm—Murray and Whisenhunt

[57] ABSTRACT

A device and method for separating particulate material from earth drilling fluids is disclosed, wherein the earth drilling fluids containing such particulate material is introduced into a container. A major portion of the particulate material separates out of the earth drilling fluid, and the fluid then passes over a baffle and through a screen, with the movement past the screen being such, combined with the screen orientation, to provide a screen which is somewhat self-cleaning in nature. The screen is periodically scraped by carrying members, and is urged against the carrying members so that the initial contact of the carrying members with the screen causes vibrations which improve the self-cleaning characteristics of the screen.

The particulate material which settles out of the drilling fluid, and the particulate material which is screened out of the drilling fluid, is collected in the bottom of the container and is removed therefrom by the carrying members up an inclined wall to a discharge point.

15 Claims, 5 Drawing Figures

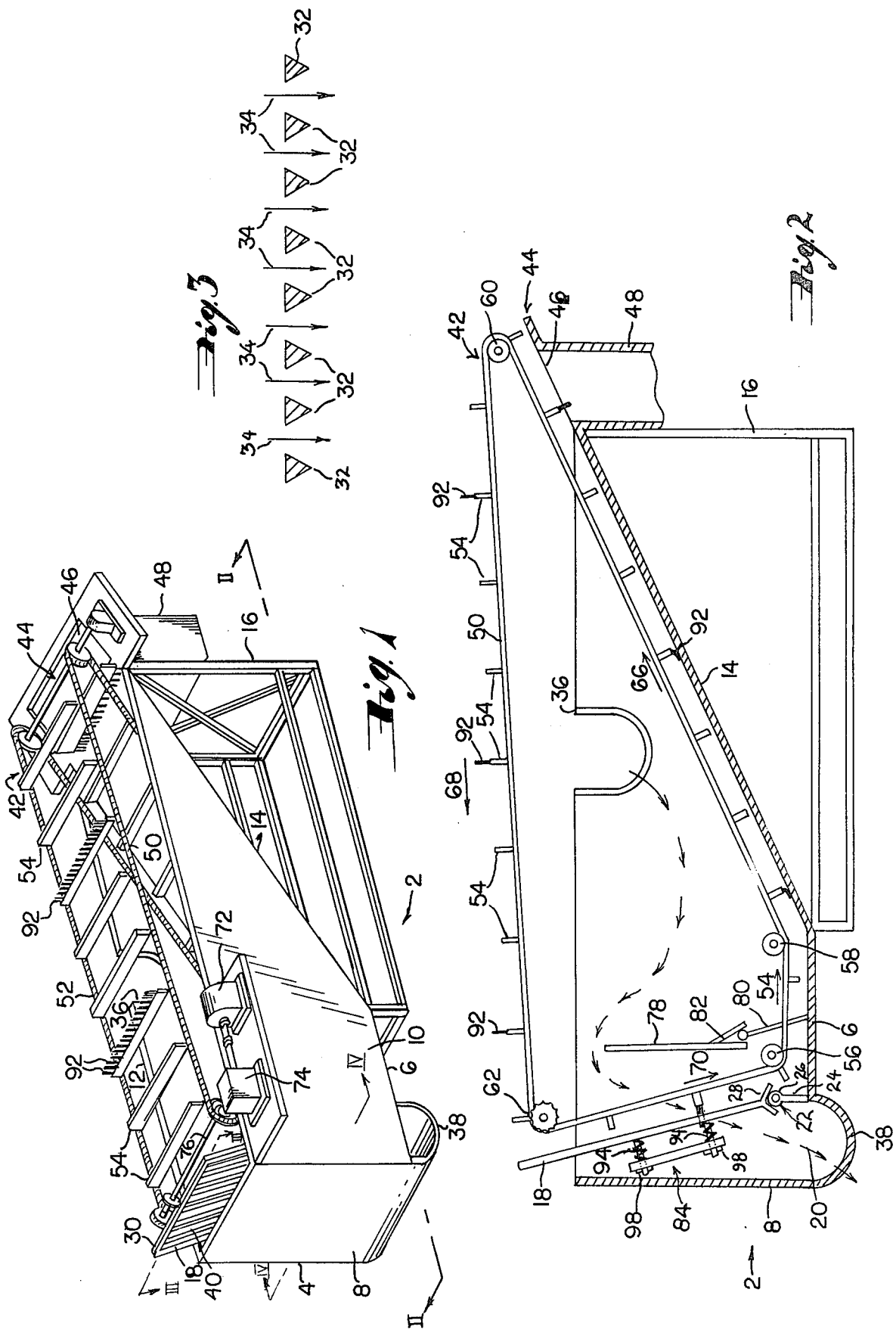

PARTICULATE MATERIAL SEPARATOR AND METHOD

BACKGROUND OF THE INVENTION

It is well known to use drilling fluids in earth drilling operations, for example in the mining and oil well drilling industries. These fluids provide cooling and lubricating properties and assist in the removal of the drilled material. A primary disadvantage associated with the use of drilling fluids is their expense, especially in the well drilling area where large volumes of fluid are required. In view of the high cost of drilling fluids, it is very desirable to develop ways of removing drilled particulate material suspended therein as a result of the drilling operations so that the fluids can be reused.

Attempts have been made in the past to develop effective ways of removing particulate material in drilling fluids resulting from drilling operations. The most common technique has been to introduce the drilling fluids containing particulate material into mud pits or settlement tanks which permits the material to settle out from the fluids. The clarified fluids are then drawn off at the top of the pit or tank, and are recirculated in the drilling operations. The major disadvantage associated with this technique is the length of time required for the material to settle out. A further disadvantage is that as the difference between the density of the material and the density of the fluid decreases, the length of time required for complete settling increases and, in many cases, complete separation of the material from the fluid cannot be achieved within a reasonable amount of time.

Certain devices have been suggested in the past for separating solid materials from fluids. U.S. Pat. No. 3,768,657 to Hoag relates to a device primarily for use in separating small metal cuttings from oil-based metal working coolants of the type generally used in machining operations. The device comprises a settling tank having one bottom wall inclined at an angle away from the bottom of the tank. The tank is also provided with a screen and a conveyor system having transverse members for removing settled material from the tank. The screen during normal operation of the device leans under its own weight against the conveyor system at an angle toward the inclined wall of the tank, so that the transverse members scrape the screen to dislodge cuttings trapped therein. The screen is pivotally mounted on the bottom of the tank so that if any material is firmly lodged in the screen, and is not removed by the transverse members, the screen is free to move away from the conveyor to permit the conveyor to continue its movement without any damage resulting to the transverse members. Fluids enter the device at a point near the inclined wall and flow in a substantially horizontal direction across the tank and through the screen to give a clarified fluid which is recovered from the tank. The Hoag device suffers from several disadvantages, the main one being that the screen is very easily blocked with material. This makes the device totally unsuited for use with earth drilling fluids containing large chunks of agglomerated material, especially in situations where the fluid has a thick mud-like consistency. When used with such fluids, the screen tends to become blocked with earth and sludge very rapidly after start up so that the amount of fluid passing through the screen is reduced to a minimum and overflow of fluid from the tank eventually occurs.

U.S. Pat. No. 3,674,145 to Schmutzler describes another type of device for clarifying fluids containing small particles of dust, said and the like. The device differs from the Hoag device in that it is not provided with a screen and separation is achieved entirely by settling out of the material. The device comprises a tank divided longitudinally into two compartments each containing baffles and a conveyor system. The end wall of the tank is inclined at an angle away from the bottom, and the baffles in each compartment are either substantially vertical to the bottom or inclined at an angle toward the inclined wall. Fluid containing suspended particulate material is passed along one of the compartments and transferred at the end of that compartment to the other compartment and passed along in the opposite direction in the other compartment.

U.S. Pat. No. 2,861,688 to Harms discloses a relatively complicated device for separating small cuttings and other particulate material from fluids. The device is designed for separating mixtures consisting of particles having a density less than the density of the fluid and particles having a density greater than the density of the fluid. The particles having a density less than the fluid are separated prior to removing the denser particles to decrease the settling time. The device has two conveyor systems, an upper one and a lower one. The upper conveyor system separates the less dense material from the tank, and has a horizontal screen associated therewith through which finer particles of greater density fall to be separated from the tank by the lower conveyor system. The main problem with this device is that the horizontally disposed screen becomes blocked very easily, making the device unsuitable for use with the dense sludges obtained during earth drilling operations.

U.S. Pat. No. 2,588,233 to Hapman discloses a device for removing sediment from fluids. The device is provided with a V-shaped floor, to reduce the overall space occupied by the device, and to enhance settling of material from the fluid. The device does not have a separation screen but is provided with a series of baffles which are arranged to cause the fluid to pass through a circuitous path. Mention is made in the patent of the possibility of providing conventional screens if additional removal of material is required, but there is no specific description of the type of screen to be used and no indication of where the screen should be placed in the device.

It can be appreciated, therefore, that a need exists for an improved device for separating rocks, clay and other chunks of agglomerated material suspended in earth drilling fluids which does not suffer from the blocking problems associated with prior devices. In particular, a need exists for a device which effects substantially complete separation of such material from the drilling fluid in a relatively short period of time with little or no stoppage to unblock the device.

SUMMARY OF THE INVENTION

In accordance with the problems and needs discussed above, the invention provides a device which is suitable for filtering earth drilling fluids containing particulate material. The term "earth drilling fluids" as used herein means any organic based or, more usually, aqueous based fluid, e.g. water, normally used in earth drilling operations. The term "particulate material" as used herein means any material normally contained in earth drilling fluids, and includes, typically, lumps of clay, compacted earth, rocks, sand, quartz, organic matter, and the like. The device comprises a container means for containing drilling fluid having particulate material suspended therein. The container means includes a base and at least one inclined wall mounted with the base extending upwardly at an angle away from the base. Mounted in the container means is a screening means for separating the particulate material from the fluid to produce a clarified fluid. The screening means is mounted in the container means such that it is inclined at an angle away from the inclined wall of the container means. Fluid inlet means are provided in the container means for admitting the fluid containing the particulate material suspended therein into the container means. Baffle means are mounted with the container means for preventing at least a substantial proportion of the particulate material from coming into contact with the screening means. In addition, the baffle means directs the flow of the fluid in a generally downward direction in the region of the screening means. This generally downward flow of fluid in the region of the screening means urges particulate material dislodged from and in the region of the screening means towards the base of the container means. The container means is provided with fluid outlet means for carrying the clarified fluid away from the container means. Outlet means are also provided in the container means for carrying separated particulate material away from the container means. Movable screen engaging means are mounted with the container means for engaging the screening means to remove particulate material lodged in the screening means. The screen engaging means cooperates with the base and the inclined wall of the container means to carry separated particulate material to the outlet means and out of the container means. Biasing means are connected to the screening means for urging the screening means in a generally upward direction against the screen engaging means.

In accordance with another aspect of the invention, there is provided a method of filtering drilling fluids containing particulate material suspended therein. The method comprises introducing the fluids containing the suspended particulate material into a container means for containing the fluids. The particulate material is permitted to settle in the container means. The fluids are caused to move towards a screening means and then in a generally downward direction in the region of the screening means to provide further settling of the particulate material and to urge particulate material in the region of the screening means towards the base. The fluids are passed through the screening means to remove particulate material from the fluids and to give a clarified fluid which is removed from the container means. The separated particulate material is carried away from the container means.

BRIEF DESCRIPTION OF THE DRAWINGS

FIG. 1 is a perspective view of a device of the invention;

FIG. 2 is a cross-sectional elevation of the device shown in FIG. 1 taken along the line II—II of the device shown in FIG. 1;

FIG. 3 is a partial cross-sectional view taken along the line III—III of the device shown in FIG. 1;

DETAILED DESCRIPTION OF THE INVENTION

Figure 4:
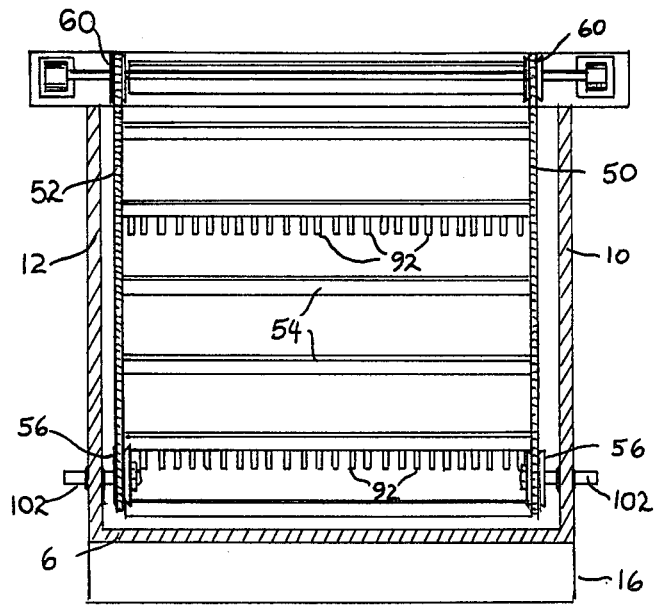
FIG. 4 is a cross-sectional end elevation taken along the line IV—IV of the device shown in FIG. 1

Referring to the drawings, the device of the invention, generally referenced 2, comprises a container means 4 for containing fluid having particulate material suspended therein. The container means includes a base 6, a front wall 8 mounted with the base and extending substantially vertically therefrom, substantially parallel side walls 10 and 12 mounted with the base and extending substantially vertically therefrom, and a back wall 14 mounted with the side walls and the base extending upwardly at an incline away from the base. The angle at which the back wall 14 is mounted with respect to the base is discussed in more detail below. The container means 4 may be fabricated from any suitable resilient material, typically galvanized sheet steel or stainless steel, and the choice of material will depend on factors such as the site of operation of the device, the extent to which the device will be exposed to the elements, the corrosiveness of the fluids to be passed through the device, and the average size range of the particulate material to be separated. It may be noted in this latter regard that the average size range of the particulate material will vary between quite wide limits in view of the variety of possible materials appearing in the drilling fluids. Thus, the average size range can vary from as little as 1 to 50 mm for materials such as sand, quartz, small rocks and the like, to as high as 10 to 80 cm for materials such as chunks of clay, earth and the like.

The container means 4 may be conveniently supported beneath the inclined wall 14 on a support frame 16. This support frame 16 may be integrally formed with the container means 4 or may be a separate item which is installed on the site simultaneously with the device.

A screening means 18 for separating the particulate material from the fluid to produce a clarified liquid 20 is mounted in the container means 4. The screening means 18 is pivotally mounted to the base of the container means by a pivot means 22. Any conventional pivot means may be employed for this purpose, but it is preferred to employ a pivot means which facilitates ready removal of the screening means for service or replacement. Preferably, the pivot means 22 comprises an upright support plate 24 extending transversely between the side walls 10 and 12 and having a rounded portion 26 extending along the upper edge thereof. In addition to serving as a pivot support, the plate 24 prevents settled material on base 6 from passing into fluid outlet means 38 and contaminating clarified fluid 20. The screening means 18 is provided along a lower edge thereof with an inverted V-shaped member 28 which cooperates with the rounded portion 26 under the weight of the screening means to give a pivotal connection. This arrangement provides free pivotal movement of the screening means and also enables the screening means to be readily removed or installed.

Figure 5:
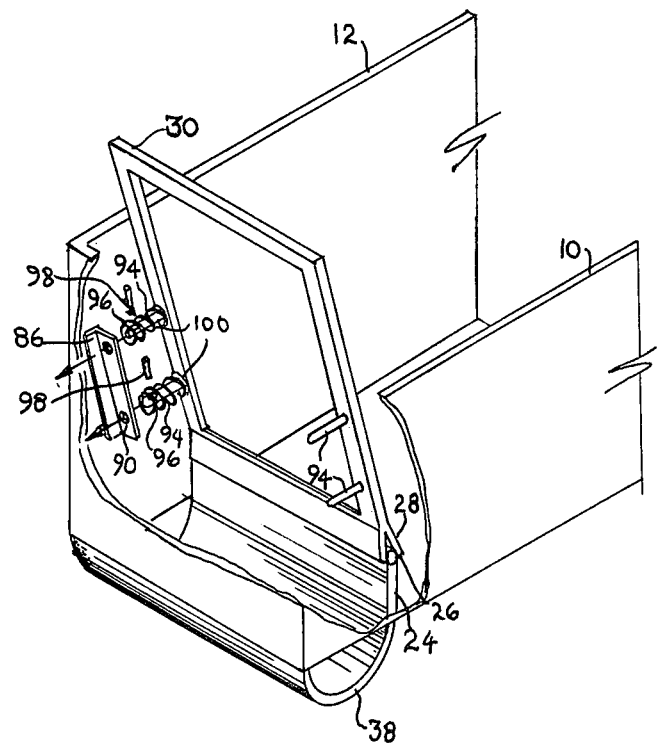
FIG. 5 is a partially broken away perspective view of a portion of the device shown in FIG. 1.

The screening means 18 is mounted in the container means 4 such that it is inclined away from the inclined wall 14. This is shown in FIGS. 2 and 5. This inclination of the screening means 18 away from the inclined wall 14 is an important feature of the invention from the viewpoint of achieving very low incidence of blocking of the screening means with particulate material. Generally, satisfactory results are obtained when the screening means is mounted at an angle of between 40 and 85 degrees to the plane of the base, for example, about 55 to 75 degrees, such as about 70 degrees. Some separation of material is obtained when the screening means leans at an angle less than 40 degrees to the plane of the base. However, there is an increased tendency for material to become lodged in the screening means as it approachees a horizontal disposition.

The screening means 18 may be comprised of any mesh or grating arrangement. Preferably, the screening means 18 comprises a plurality of substantially parallel spaced apart bars 40 supported in a frame 30. This arrangement permits fluid to pass through the screening means 18 as represented by the arrows 34 in FIG. 3, while preventing passage of particulate material. FIG. 3 shows bars 32 having a triangular cross-section but it is equally possible to employ bars having other cross-sections, for example a square, T-shaped, circular or eliptical cross-section.

Fluid inlet means 36 for admitting raw fluid containing suspended particulate material into the container means, and fluid outlet means 38 for carrying away clarified fluid 20 are provided in the container means 4. A pipe (not shown) is mounted with the container means 4 for carrying the raw fluid to the inlet means 36 in the side wall 12. Outlet means 38 comprises a semicircular trough for carrying clarified fluid away from the container means 4. The trough is mounted with the container means 4 and stands beneath the base 6, with one edge of the trough being attached to front wall 8. The trough 38 in the embodiment shown in FIGS. 1 and 2 thus also serves as a support for the container means 4 in addition to the support frame 16. Generally, the dimensions of the fluid outlet 38 and support frame 16 are arranged so that the base 6 of the container means 4 is substantially horizontal.

Movable screen engaging means 42 are mounted with the container means 4 for engaging the screening means 18 and removing particulate material lodged in the screening means. In addition the screen engaging means cooperates with the base 6 and the inclined wall 14 to carry separated material to outlet means 44 and out of the container means 4. Outlet means 44 includes an opening 46 and a chute 48 through which particulate material falls into a collector (not shown). The movable screen engaging means 42 includes a first endless belt 50, a second endless belt 52, and carrying members or flights 54 interconnecting belts 50 and 52 by extending transversely between side walls 10 and 12. The endless belts 50 and 52 are positioned for movement along the side walls of the container means 4, by using a first set of pulleys 56 rotatably mounted in the container means near the corner where base 6 joins fluid outlet means 38. A second set of pulleys 58 are rotatably mounted in the container means near the junction of base 6 and inclined wall 14. A third set of pulleys 60 are rotatably mounted near the outer end of inclined wall 14, and a set of adjustable drive pulleys 62 are rotatably mounted near the upper edge of front wall 8 and outwardly of pulleys 56. By this arrangement, carrying members 54 move along a first course represented by arrow 64 from pulleys 56 to 58 for cooperating with base 6 to carry separated particulate material toward inclined wall 14, along a second course represented by arrow 66 from pulleys 58 and 60 for cooperating with inclined wall 14 to carry separated material into opening 46, along a third course represented by arrow 68 from pulleys 60 to 62, and along a fourth course represented by arrow 70 from pulleys 62 to 56 for movement along the screening means 18. A motor 72 is mounted with container means 4 and operates through reduction gears 74 to turn shaft 76 on which is mounted drive pulleys 62 to move the endless belts 50 and 52 and carrying members along the above-described four courses of travel.

A baffle means 78 is mounted in container means 4 and extends vertically from base 6 between the first and third courses of travel of movable screen engaging means 42. The baffle means extends between side walls 10 and 12 but does not extend to the top of these side walls. The baffle means prevents at least a substantial proportion, that is at least 70%, preferably at least 80%, more preferably at least 95% of the particulate material from coming into contact with the screening means and causing blocking thereof. In addition, the baffle means 78 serves to cause the fluid entering the container means to rise over the top of the baffle means 78, as shown by the arrows 40, and then to flow in a generally downward direction past and through the screening means 18. As the fluid passed through the constricted space near the top of the baffle means, the velocity of flow of the fluid tends to increase giving added velocity in the downward direction of flow in the region of the screening means. The combined effect of the screening means 18 leaning back from the inclined wall 14 and the downward direction of flow of the drilling fluids containing suspended particulate material which has not yet settled out is to reduce the incidence of blocking of the screening means with particulate material (a "self-cleaning" effect) and to urge the particulate material towards the base 6.

The baffle means 78 is provided with a flap 80 which is pivotally mounted at its upper edge to the baffle means 78. The flap 80 inhibits the flow of fluid and material under the baffle means into the region of the screening means while permitting movement of the screen engaging means along the base. A cover plate 82 is provided to extend over the pivotal mounting of the flap 80 to reduce the chances of the pivotal mounting becoming fouled by settling particulate material.

The screening means 18 may be supported at a point near its upper edge by any suitable support means and may even rest against the upper edge of wall 8. It is preferred, however, to provide a biasing means 84 within the container means 4 for urging the screening means in a generally upward direction towards the movable screen engaging means 42 to contact the carrying members 54. While any suitable biasing means can be used, for example a pneumatic system including a piston and cylinder combination, it is preferred to employ the arrangement illustrated in FIG. 5. Two pieces of L-shaped metal 86 and 88 (88 is not shown) are firmly secured to the walls 10 and 12 at an angle desired for the screening means. The pieces 86 and 88 are provided with holes 90 which receive rods 94 mounted in the frame 30. Each rod has an aperture 96 near the end thereof which receives a pin 98 to secure the rod in the hole. Each rod 94 also carries a coil spring 100 which allows the screening means to vibrate during operation of the device. Thus, the coil springs 100 add a vibrational component to the screening means which further aids in dislodging any material therefrom. To further assist in maintaining the screening means clear, especially of smaller particles such as sand, quartz and the like, every third carrying member 54 is provided with flexible finger-like extensions 92 which come into contact with the screening means 18 on the fourth course of travel and project between the bars 28 to remove the material lodged therebetween.

The distance between the screening means 18 and the fourth course can be adjusted by movement of pulleys 62 so that the carrying members 54 forceably strike the screening means as they round the pulleys 62 to impart vibrational movement to the screening means. This further assists in removing material wedged in the screening means.

To avoid pieces of material becoming jammed in the region of the base 6, the pulleys 56 and 58 are not mounted on axles which extend across the device but rather on bolts 102 which project through side walls 10 and 12. This is shown in FIG. 4. This reduces the chances of large pieces of material becoming jammed in the region of the base 6.

The angle at which the inclined wall 14 is inclined with respect to the base 6 is such that pieces of material do not roll back over the carrying members 54 to the base 6. Generally, this angle is from about 20 degrees to 60 degrees to the base, such as 20 degrees to 45 degrees, for example 25 degrees to 35 degrees, normally about 30 degrees.

It is preferred, according to conventional practice to introduce chemical additives, such as thinners, viscosifiers and the like, into the liquid in the container means to aid in the smooth operation of the device. In addition, it is possible to introduce such additives downstream of the device into the clarified fluid as it is subjected to further processing. The additives can then be recovered and recirculated to the drilling site for further use.

When the device is being used to clarify "polymer muds", i.e. muds containing polymer additives to aid settling out, it is preferred to use a large settling tank to obtain satisfactory settling. Preferably, this is achieved by enlarging the container means so that its overall dimensions are for example about 20 ft. by 20 ft. by 10 ft. Alternatively, the same result may be achieved by placing a large settling tank between the drilling site and device to permit some preliminary settling to occur prior to introduction of the drilling fluids into the device.

What is claimed is:

1. A device suitable for filtering earth drilling fluids containing particulate material, comprising:
   (a) container means for containing said fluid, said container means having a base and at least one inclined wall mounted with said base, and extending upwardly at an incline away from said base;
   (b) screening means operatively connected to said container means for separating said particulate material from said fluid to produce a screened fluid, said screening means being inclined away from said inclined wall and remote from said inclined wall;
   (c) fluid inlet means operatively connected to said container means for admitting said fluid into said container means at a location laterally remote from said screening means;
   (d) baffle means mounted between said fluid inlet means and said screening means and within said container means substantially over said base for preventing at least a substantial proportion of said particulate material from coming into contact with said screening means, said baffle means directing the flow of said fluid over the top of said baffle means, and in a generally downward direction in the region of said screening means to urge particulate material in the region of said screening means towards said base, while substantially reducing the flow of said particulate material beneath said baffle means toward said screening means;
   (e) fluid outlet means operatively connected to said container means for carrying said screened fluid away from said container means;
   (f) separate particulate material outlet means operatively connected to said container means for directing separated particulate material out of said container means;
   (g) movable screen engaging means operatively connected to said container means for engaging said screening means and removing particulate material lodged in said screening means, said screen engaging means cooperating with said base and said inclined wall to carry separated particulate material to said separated particulate material outlet means and out of said container means; and
   (h) biasing means connected to said screening means for movably urging said screening means in a generally upward direction to move against said screen engaging means.

2. A device according to claim 1 wherein said inclined wall is mounted at an angle of about 20 degrees to about 45 degrees to said base.

3. A device according to claim 2 wherein said angle is about 30 degrees.

4. A device according to claim 1 wherein the screening means is inclined at an angle of about 40 degrees to 80 degrees to said base.

5. A device according to claim 4 wherein said angle is about 75 degrees.

6. A device according to claim 1 wherein said biasing means includes coil springs mounted on rods connected to said screening means.

7. A device according to claim 1 wherein said screening means includes a plurality of parallel spaced-apart bars forming a grating, said grating preventing passage therethrough of particulate material and allowing said screened fluid to pass therethrough.

8. A device according to claim 1 wherein said screen engaging means includes two spaced-apart endless belts movably mounted in said container means, and a plurality of carrying members mounted on said belts, said carrying members cooperating with said screening means, said base and said inclined wall to carry separated particulate material to said separated particulate material outlet means and out of said container means.

9. A device according to claim 8 wherein said carrying members strike said screening means causing said screening means to vibrate.

10. A device according to claim 1 wherein a flap is pivotally mounted with said baffle means near said base for inhibiting movement of particulate material and fluid toward said screening means while permitting movement of said screen engaging means along said base.

11. A device according to claim 1 wherein fingers are mounted on carrying members of said screen engaging means to aid in clearing said screening means.

12. A method of filtering earth drilling fluids containing particulate material suspended therein to separate at least a portion of said particulate material, comprising:
   (a) introducing said earth drilling fluids containing said particulate material suspended therein into a container having a base and at least one inclined wall mounted at one side of said base and extending upwardly at an angle away from the base, said container also including a screening means for separating particulate material from earth drilling fluid inclined away from said inclined wall and remote from said inclined wall;

(b) urging the earth drilling fluid to flow towards the screening means and causing said particulate material to settle in said container upstream of said screening means during at least a portion of said fluid flow towards the screening means while substantially reducing flow of said particulate material toward said screening means;

(c) causing the earth drilling fluid to flow in a generally downward direction in the region of the screening means to provide further settling of particulate material and to urge particulate material in the region of the screening means away from the screening means toward the container base;

(d) passing earth drilling fluid through the screening means to remove at least some of the particulate material in the earth drilling fluid to produce a screened fluid;

(e) removing the screened fluid from the container through an outlet;

(f) urging the screening means away from the outlet, and at least periodically vibrating the screening means to aid in removal of any particulate material stuck thereon or therein; and (g) conveying the separated particulate material out of the container.

13. Method of claim 12, wherein at least 70% of the particulate material introduced into said container settles in said container during at least a portion of the flow towards the screening means and does not contact the screening means.

14. Method of claim 12, wherein the earth drilling fluid is passed through a screening means which comprises a plurality of generally parallel spaced-apart bars forming a grating, said grating preventing passage therethrough of at least some of said particulate material and allowing said screened fluid to pass therethrough.

15. Method of claim 14, wherein said grating is periodically cleaned by passing fingers down through the spaces between said parallel spaced-apart bars.